Oct. 12, 1965   A. G. WEIL ETAL   3,211,338
ICE HANDLING APPARATUS
Filed Sept. 11, 1963   2 Sheets-Sheet 2
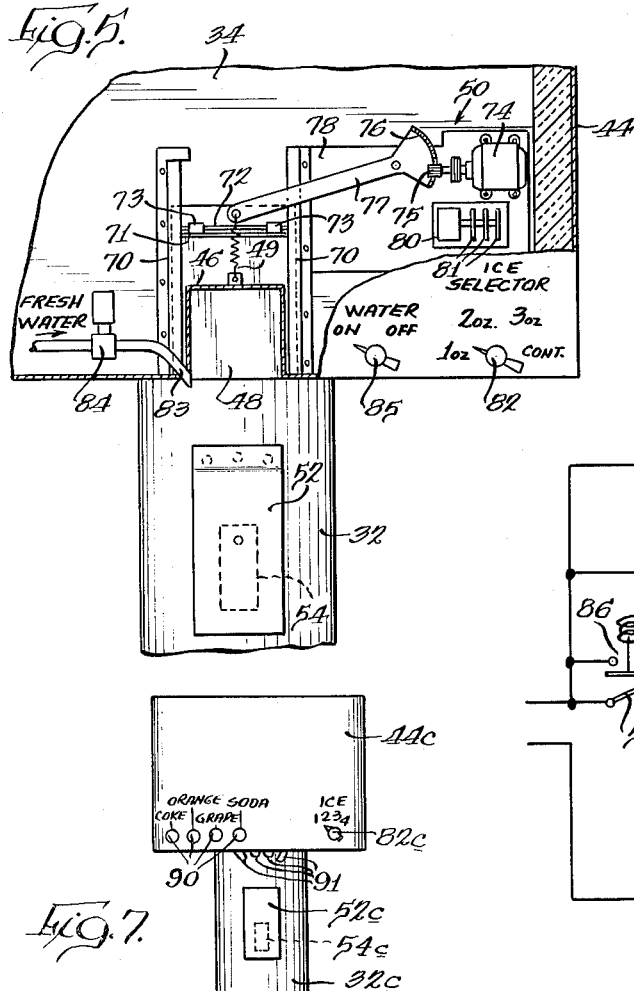
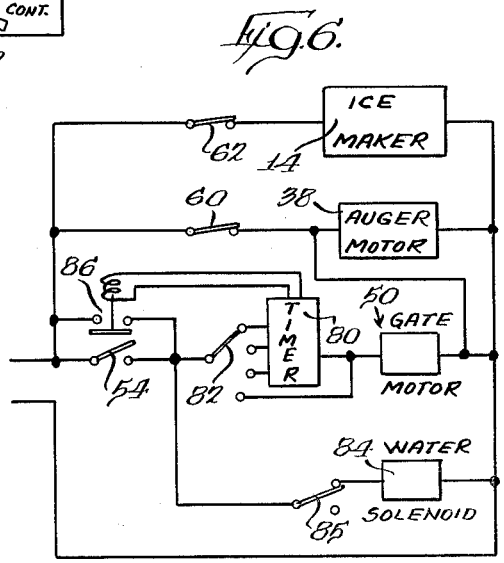
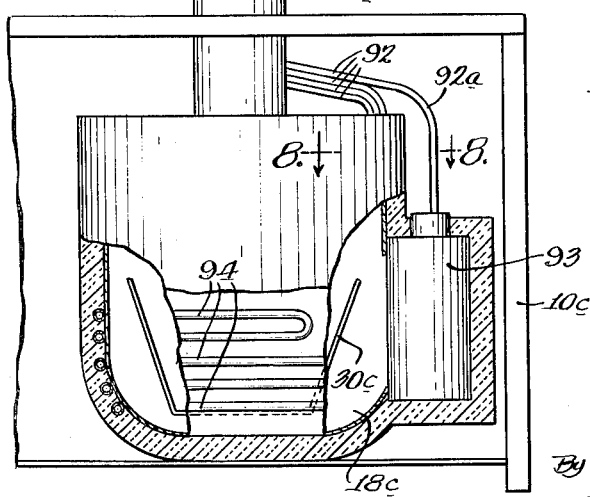
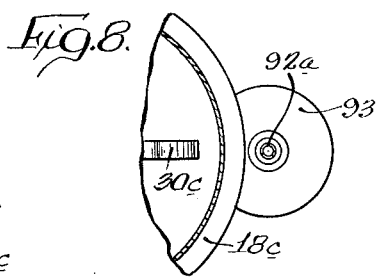
INVENTORS:
Albert G. Weil
Walter A. Zeuschner
Kenneth W. Zeuschner
By Gary, Parker, Juettner & Cullinan
Attys United States Patent Office 3,211,338
Patented Oct. 12, 1965

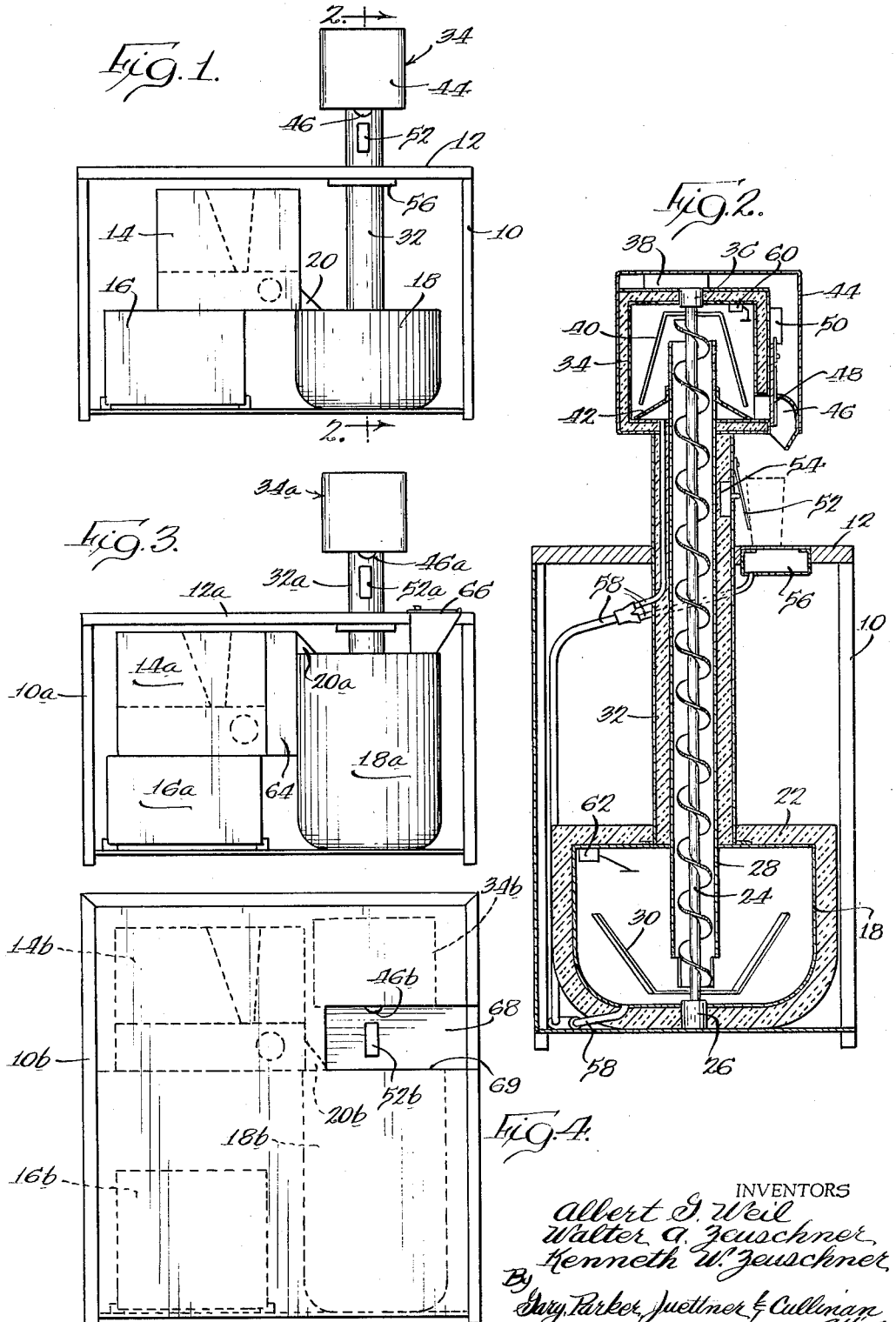

3,211,338
ICE HANDLING APPARATUS
Albert G. Weil, Walter A. Zeuschner, and Kenneth W. Zeuschner, Chicago, Ill., assignors to Remcor Products Company, Chicago, Ill., a corporation of Illinois
Filed Sept. 11, 1963, Ser. No. 308,248
9 Claims. (Cl. 222—70)

The present invention relates to ice handling apparatus, particularly improved apparatus for dispensing measured quantities of ice into beverage glasses and the like, and to combined ice handling and beverage dispensing apparatus.

In the food and beverage service industries, it is desirable to provide means for expeditiously dispensing a predetermined quantity of ice into a glass to facilitate service of ice water and cold beverages to customers. Heretofore, the waiter or waitress has been required to manually scoop-up and insert in the glass either a predetermined number of ice cubes or a predetermined quantity of crushed ice.

The object of the present invention is to provide improved means for automatically dispensing a predetermined quantity of ice, especially crushed ice, into a glass as a function simply of the waiter or waitress positioning the glass beneath a dispenser opening.

Another object of the invention is to provide improved means for automatically dispensing any one of a number of predetermined quantities of ice and for continuously dispensing ice at the option of the user.

A further object of the invention is the provision of improved means for dispensing at one convenient location and simultaneously both the desired amount of ice and a beverage.

A still further object is the provision of improved means as aforesaid embodied in economical form, having particular compatibility with food and beverage service installations, and affording large capacity ice storage without bulkiness or interference with the normal activities of service personnel.

Other objects and advantages of the invention will become apparent in the following detailed description.

In order to acquaint those skilled in the art with the manner of making and using the apparatus of this invention, there will be described, in conjunction with the accompanying drawings, preferred embodiments of the invention and preferred manners of making and using the same.

In the drawings, wherein like reference numerals indicate like parts:

FIGURE 1 is a front view of a first embodiment of ice handling apparatus made in accordance with the present invention, the front of the cabinet being removed to reveal the apparatus;

FIGURE 2 is an enlarged vertical cross-section taken substantially on line 2—2 of FIGURE 1;

FIGURE 3 is a view similar to FIGURE 1 of a second embodiment of the invention;

FIGURE 4 is a front elevation of a third embodiment of the invention;

FIGURE 5 is a fragmentary view of the apparatus particularly illustrating the dispensing means thereof;

FIGURE 6 is a schematic diagram of a preferred electrical circuit for the apparatus of FIGURE 5;

FIGURE 7 is a view generally similar to FIGURE 1 of a further embodiment of the appartus of the invention comprising combined ice handling and beverage dispensing apparatus, portions of the apparatus being shown in section; and FIGURE 8 is a fragmentary plan view of part of the apparatus of FIGURE 7, the view taken substantially on line 8—8 of FIGURE 7.

Referring now to the drawings, and particularly to FIGURES 1 and 2, the first embodiment of the apparatus of this invention is shown as combined with a cabinet 10 in the form of a base counter for a restaurant, kitchen or bar and having a counter top 12 of conventional height. Disposed within the cabinet are an ice maker 14, which may suitably be of the type disclosed in the copending application of Albert G. Weil, Walter A Zeuschner and Kenneth W. Zeuschner, Serial No. 277,914 filed May 3, 1963, the refrigerating apparatus 16 for the ice maker, and a large capacity or main ice storage chamber or hopper 18. In the embodiment of FIGURE 1, the ice maker 14 is positioned just beneath the top of the cabinet 10 with its discharge outlet or chute 20 extending over the upper edge of the hopper 18, whereby to discharge directly into the hopper. As described in detail in said application Serial No. 277,914, the ice maker produces slabs of ice, crushes the slabs, and automatically discharges therefrom bite-sized pellets of hard clear ice; which gravitate through the outlet or chute 20 into the hopper 18.

The hopper 18 is essentially a tub adapted to hold a large quantity of crushed ice, for example, from about 25 pounds up to about 100 pounds. In the embodiment illustrated, 25 to 30 pounds of ice can readily be stored in the hopper. To mitigate melting of the ice, the hopper 18 is thoroughly insulated with a thick layer of insulating foam or the like, and is provided with a similarly insulated cover 22.

Extending vertically upwardly from the bottom of the hopper 18 is an ice elevating means preferably in the form of a rotary vertical flight auger or screw 24. The auger is journalled at its lower end in a bearing 26 provided in the base wall of the hopper and the same is enclosed within an upright tube 28. The tube 28 is provided at its lower end with inlet openings accommodating entry of ice to the auger, and these openings may if desired include baffle plates assisting in guiding ice to the auger. Preferably, an agitator 30, suitably in the form of two paddles, is secured to the lower end of the auger to maintain the crushed ice in the hopper 18 in a free flowing condition and to urge it into the auger inlet.

To mitigate melting of the ice therein, the portions of the auger tube 28 which would otherwise be exposed to atmosphere are heavily insulated with a thick layer of foam and the entire assembly is encased within a second vertical tube or housing or post 32. The tubes 28 and 32 are both secured to the top of the hopper 18, and both project upwardly through a hole in the counter top 12 of the cabinet 10, with the outer tube 32 being fixedly secured to said top.

At a predetermined distance above the top 12, preferably at a height somewhat in excess of the height of conventional beverage serving glasses, the tube 32 terminates and the tube 28 continues upwardly into a second ice storage hopper 34 which is mounted on the tubes 28 and 32. The hopper 34 is considerably smaller than the main storage hopper 18 in the embodiment of the invention shown in FIGURE 1, the hopper 34 having, for example, about 25% the storage capacity of the hopper 18.

In other embodiments, the hopper 34 could be larger, e.g., taller, to provide say 50% or 75% the capacity of the lower hopper, and could even be the same size or larger particularly in embodiments such as shown in FIGURE 4. The tube 28 extends to adjacent the upper end portion of the hopper 34 and terminates at about the upper end of the auger, whereby the auger may discharge ice into the upper hopper. A bearing 36 in the top wall of the hopper journals the upper end of the auger, and an electric motor 38 is provided (either at the top or the bottom of the auger) for driving the auger. To maintain the ice in the upper hopper in free flowing condition, a second agitator 40 is secured to the auger adjacent its upper end. Also, an inclined perforate baffle plate 42 is provided in the lower end of the upper hopper to separate the ice from condensate and to guide the ice toward the outer lower margin of the hopper. Preferably, the upper hopper is well insulated, and is provided with a decorative exterior cover 44.

At one side of the hopper (at the front side of the cabinet), the cover 44 encloses and electrically operated dispensing mechanism, which will be described in detail in conjunction with FIGURE 5. Briefly, this mechanism comprises an ice dispensing chute 46 leading from the bottom of the upper hopper to the lower face of the cover 44, a movable door 48 normally closing the chute and adapted to be opened to accommodate discharge of ice, and motor means 50 for opening the door. Disposed below the dispensing chute on the front face of the post defined by the tube 32 is a flexible or bendable flapper plate 52 adapted to be contacted by a glass, and behind this is a control switch 54 for the motor means 50.

A drain opening 26 is provided in the counter top 12 below the chute 46, and this drain and both of the hoppers are provided with appropriate drain hoses 58 for discharging water resulting from ice melting.

In use, the ice maker is set into operation to produce hard clear pellets of crushed ice and discharge the same into the lower or large capacity hopper 18. The auger 24 is operating at this time, whereby the agitator 30 maintains the crushed ice in free flowing condition and feeds it to the inlet end of the auger 24 and tube 28, whereupon the auger elevates the ice to fill the tube 28 and discharge ice into the upper or small capacity hopper 34. The auger continues to operate until the upper hopper is filled with ice, as determined by a normally closed level sensing switch 60 or the like provided in the upper hopper and connected to de-energize the auger motor 38 when the switch is operated by virtue of the ice level in the upper hopper. The ice maker 14 continues to operate until the lower hopper 18 is full of ice, as determined by a second normally closed level sensing switch 62 or the like located in the lower hopper and connected to de-energize the ice maker when the switch is actuated. Whenever sufficient ice is removed from the upper hopper to permit closing of the switch 60, the auger is set into operation to maintain the supply of ice in the upper hopper, and similarly the ice maker is operated periodically to maintain the supply of ice in the lower hopper.

To dispense ice into a glass, a waiter or waitress need only place a glass (as shown in dotted lines in FIGURE 2) beneath the dispenser chute 46 and press the glass against the flap 52, whereupon the switch 54 energizes the motor means 50 to open the door 48 and accommodate discharge of ice. Closing of the switch 54 also energizes the auger motor 38 thereby to cause the agitator 40 to insure prompt discharge of ice through the chute and into the glass. The inclined bottom wall 42 of the upper hopper facilitates convenient discharge of the ice in the manner described. The switch 54 may directly energize the motor means 38 and 50, whereby the waiter or waitress may control the amount of ice delivered to the glass simply by observing the glass and removing it when it contains the desired amount of ice. Removal of the glass in this case would cause the switch 54 to open and thus de-energize the motors and close the dispenser door. Alternatively, the switch 54 may activate a timer for the motor means, whereby to open the door for a predetermined time to accommodate discharge into the glass of a predetermined selected amount of ice.

By virtue of the upper hopper and the ice supply means therefor, ice is always immediately at hand for dispensing into a glass, particularly in the embodiment of FIGURE 1, yet the entire dispensing mechanism is essentially a freely exposed and fully usable counter top having only the post 32 and the small box 34 on the upper surface thereof. The result is an extremely compact structural arrangement wherein the ice dispenser is small, neat and attractive, does not obstruct the service area in the restaurant or kitchen, and does not require a bulky overhead or counter top storage hopper for the ice.

The two hoppers 18 and 34 and the auger tube 28 in combination provide a large storage capacity for ice, so that both hoppers can be filled during relatively idle or low traffic periods and thus provide a substantial reservoir of ice to supply the demand during peak traffic periods. As indicated above, the storage capacity may range from about 40 pounds of ice to about 140 pounds, depending upon the size of the unit. For a smaller unit as depicted in FIGURE 1, the lower hopper may store 25 to 30 pounds of ice, the upper hopper 5 to 7 pounds and the tube 28 another 3 to 5 pounds. Yet, the upper surface of the unit is free for use and presents to view only the post 32 and the small box 34.

An ice handling mechanism affording all of the advantages above described, and at the same time affording a substantially increased ice storage capacity, is depicted in FIGURE 3. This unit is identical to the unit of FIGURES 1 and 2, except for a few components. All of the elements in FIGURE 3 identical to those in FIGURE 1 have been indicated by the same reference numerals with the suffix (a). As shown, the unit of FIGURE 3 includes a base cabinet 10a having a freely accessible exposed counter top 12a, an ice maker 14a with its refrigerating mechanism 16a disposed within the cabinet, a large capacity storage hopper 18a within the cabinet, an auger containing mounting post 32a extending upwardly through the counter top from the hopper 18a, an upper hopper 34a on top of the post, and dispensing means 46a–52a associated with the upper hopper and post.

The major distinctions of the embodiment of FIGURE 3 over FIGURE 1 are that the lower large capacity hopper 18a is considerably larger and extends substantially to the top of the cabinet 10a, and that the ice maker 14a is provided with an elevator 64 (preferably of the character shown in application Serial No. 277,914) for conveying crushed ice from the ice maker to the top of the hopper 18a, where it flows via chute 20a into the hopper. By virtue of this arrangement, ice storage capacity is practically doubled without increasing the overall size of the complete assembly. Also, the increased storage capacity admits of use of a larger capacity ice maker for high volume requirements, or an even smaller ice maker where large quantities of ice are required for short periods of time at fairly widely separated intervals. In addition, extension of the storage chamber 18a up to the counter top level of the cabinet admits of the provision of a trap door 66 in the counter top facilitating removal of ice in bulk from the hopper 18a.

For even greater capacity for ice production and storage, the unit of FIGURE 4 is recommended. This unit may suitably constitute a full size, head-height cabinet, e.g. about 65 inches tall, housing a large capacity ice maker, large capacity storage chambers or hoppers, a large capacity ice elevating auger or screw, and large capacity or rapidly acting dispensing means. As depicted in FIGURE 4, a cabinet 10b houses in the upper left-hand portion thereof a large capacity ice maker 14b, such as one for producing 400, 600, 800 or more pounds of ice per 24 hour period. Mounted below the ice maker within the cabinet is the refrigerating mechanism 16b. Next to the refrigerating mechanism is a large ice storage hopper 18b, such as one for holding several hundred pounds of ice, the upper end of the hopper being positioned just below the discharge chute 20b from the ice maker for receiving ice therefrom. Extending upwardly from the hopper 18b is the ice elevating auger or screw (not shown) for conveying ice to an upper hopper 34b which may have substantially greater capacity than the upper hoppers previously described. In the space between the hoppers 18b and 34b, the front face of the cabinet is provided with a recessed area 68 defining a glass supporting shelf 69 disposed beneath the dispenser outlet 46b, the wall forming the back of this area carrying a dispenser actuator 52b. Thus, large capacity ice production and storage is provided according to this invention in a compact, economical arrangement presenting a minimum of obstruction to and greatly facilitating convenient performance of the services involved in preparing and serving iced beverages.

Referring now to FIGURE 5, a preferred embodiment of the ice dispensing means of this invention is illustrated as comprising (as previously described) a dispenser chute 46, a vertically reciprocable guillotine door 48 for selectively opening and closing the chute, a spring 49 normally holding the door closed, motor means 50 for opening the door, a switch 54 for controlling operation of the motor means and a protective actuator flap 52 over the switch. The door 48 is preferably a thin flat plate of sheet metal sharpened at its lower edge and guided at its side edges for vertical reciprocation by a pair of channel-shaped guide rails 70. A stop flange 71 extends between the rails 70 for cooperation with a stop flange 72 on the door, and resilient bumpers 73 are provided on the flange 71 to cushion the closing movement of the door.

In the illustrated embodiment, the door opening motor means 50 comprises an electric clutch motor 74, such as that manufactured by Molon Motor & Coil Corp., Rolling Meadows, Illinois. Essentially, this is a unidirectional rotary motor having clutch means therein whereby the motor will exert a predetermined driving force and the clutch will slip when the resistance of the driven element to movement exceeds the clutch force. This motor may, for example, carry a pinion 75 meshed with an arcuate rack 76 on a lever 77, the lever being pivoted intermediate its ends on a supporting frame 78 and being pivotally connected at its opposite end to the upper edge portion of the door 48. Thus, when the motor is energized, the same will open the door and then hold the door open by virtue of the driving force exerted through the slipping clutch. When the motor is de-energized, the spring 49 immediately closes the door, and the sharp lower edge of the door chops through the ice in the chute, like a guillotine, and promptly closes the chute. If desired, a solenoid could be substituted for the motor means 74–78 herein illustrated.

According to the invention, the motor means 50 may be selectively operated for any one of several intervals of time, thereby to hold the door 48 open for such intervals of time and accommodate discharge of predetermined respective amounts of ice. To this end, a timer 80 is mounted on the frame 78, the same having a plurality of timer cams 81 associated with respective motor controlling switches (not shown) for energizing the motor for respective time intervals. Selectively to connect the timer cam switch means in the circuit of the motor, a selector switch 82 is mounted on the front wall of the upper hopper housing 44, the switch suitably having three positions corresponding respectively to the timer cams and a fourth position for directly connecting the motor and the switch 54. The selector 82 is selectively settable to any one of four graduations marked on the housing, for example, one ounce, two ounces, three ounces and continuous discharge, the cams 81 being appropriately set to time motor operation for respective intervals adequate to supply one ounce, two ounces and three ounces of crushed ice, and the last position permitting manual control over ice discharge, particularly for filling water pitchers and the like.

In the latter respect particularly, but also for facilitating service of glasses of water, a fresh water supply tube 83 projects directly into the chute 46 from the interior of the hopper housing 44, the tube being directed to discharge water into a glass, pitcher or other receptacle placed below the chute 46 in position to operate the switch 54. The supply of water via tube 83 is under the control of a solenoid operated valve 84, which may be energized in a variety of manners. Preferably, a water control switch 85 is mounted on the housing 44 adjacent the selector switch 82.

In the preferred embodiment of the invention, the electrical circuit is constituted in the manner illustrated in FIGURE 6. As shown, the ice maker 14 and the auger motor 38 are disposed in parallel across the power supply, the ice maker being under the control of series connected level switch 62 and the motor 38 being under the control of series connected level switch 60. Disposed in parallel with these circuits is an ice and water control circuit comprised of a series connection of the manually operated switch 54, the selector switch 82, the timer 80 and the gate or door motor means 50. When the timer is in use, the same holds the circuit to the motor closed for the predetermined time interval, and holding means is depicted herein as a relay 86 having switch means in parallel with the switch 54. The water control in this embodiment is shown as an on-off selector switch 85 connected in series with the switch 54, the switch contacts of the relay 86 and the solenoid 84 whereby selectively to energize the solenoid 84 during periods of ice discharge and thereby simultaneously to fill a receptacle with both ice and water. To correlate the supply of water and ice, the water supply tube 83 preferably includes a conventional water valve (not shown).

In addition to the facility with which water can be supplied simultaneously with ice, the present invention affords means for the convenient simultaneous service of crushed ice and a variety of beverages. As shown in FIGURES 7 and 8, an apparatus similar to that of FIGURE 1 or 3 and including selector means 82c for selecting any one of several different amounts of ice, as illustrated in FIGURE 5, is also provided on the front face of the upper hopper housing 44c thereof with a plurality of push buttons 90 for facilitating selection of any one of a plurality of beverages, for example, "Coke," orange, grape, or soda. Each of these buttons controls appropriate means, coupled in series with glass actuated switch 54c, for effecting discharge of ice and the selected beverage into the glass. The means may suitably comprise switches in parallel with one another and in series with the switch 54c, the respective switches controlling respective solenoid operated valves (not shown) in respective supply lines for the several beverages.

Each such supply line terminates in a nozzle tip, indicated at 91 in FIGURE 7, immediately adjacent or within the ice chute so as to insure simultaneous discharge of both ice and beverage into the receptacle positioned to actuate switch 54c. The beverages are supplied to these tips from supply lines 92 extending upwardly through the post 32c from the base of cabinet 10c. Since most beverages will be carbonated by addition of charged water to a beverage syrup or extract, a charged water or soda line 92a is illustrated as leading from a carbonator 93 mounted within the cabinet base.

The carbonator 93 conventionally is chilled, and in the past the chilling has been accomplished by mounting the carbonator on a freezer plate supplied with refrigerant from a separate refrigerating mechanism. According to the present invention, this expensive and clumsy arrangement is obviated by mounting a cylindrical carbonator tank with at least part of its cylindrical wall projecting into the lower ice hopper 18c. Specifically, in the embodiment of FIGURES 7 and 8, the side wall of the hopper 18c is cut out and the cylindrical carbonator is secured within the cut out portion with its wall exposed to the ice in the hopper and extending to adjacent the agitator 30c. Consequently, the agitator continually piles crushed ice against the carbonator to chill the same at all times during operation of the illustrated apparatus.

In addition, the apparatus includes a plurality of individual coil sections 94 around the bottom portion of the hopper 18c, over the area not occupied by the carbonator, through which water and/or respective beverage syrups or extracts are caused to flow on their way to the dispenser means 90–91 to facilitate discharge of cold, carbonated beverages containing crushed ice, wherein the ice can add to the pleasure of the drink without immediately melting or diluting the drink.

It is thus obvious that all of the objects and advantages of this invention have been shown herein to be attained in a convenient, economical and practical manner.

While the presently preferred embodiments of the invention have been shown and described herein, it is to be appreciated by those skilled in the art that various changes, rearrangements and modifications may be made therein without departing from the scope of the invention, as defined by the appended claims.

What is claimed is:

1. Ice handling apparatus comprising a counter, a large capacity main storage chamber for ice beneath said counter, ice elevating means extending upwardly from said main chamber through and above said counter, a second storage chamber spaced above said counter and mounted on the upper end portion of said elevating means, said elevating means discharging into the upper end portion of said second chamber, and ice dispensing means at the lower end of said second chamber disposed above said counter area.

2. Ice handling apparatus comprising a lower storage chamber for ice, rotary auger means extending upwardly from the central part of the bottom of said lower chamber, an upper ice storage chamber mounted centrally thereof adjacent the upper end portion of said auger means, said auger means discharging into the upper end portion of said upper chamber, an ice agitating paddle in each of said chambers each secured to said auger means for rotation therewith, and ice dispensing means adjacent the lower end of said upper chamber.

3. Ice handling apparatus comprising a counter, a large capacity main storage chamber for ice beneath said counter, an ice elevating rotary auger extending upwardly from the central portion of the bottom of said main chamber through and above said counter, an enclosing tube for said auger mounted on said counter and extending from adjacent the bottom to adjacent the top of said auger, a second storage chamber spaced above said counter and mounted centrally thereof on the upper end portion of said tube, said auger discharging into the upper end portion of said second chamber, an ice agitating paddle in each of said chambers each secured to said auger for rotation therewith, and ice dispensing means at the lower end of said second chamber disposed above said counter.

4. Self-contained ice making, storing and dispensing apparatus comprising a cabinet, an ice maker in said cabinet, a first storage hopper for ice in the lower portion of said cabinet, means for discharging ice from said ice maker into said first hopper, ice elevating means extending upwardly from said hopper, a second storage hopper for ice mounted adjacent the upper end of said elevating means, said elevating means discharging into the upper end portion of said second hopper, and dispensing means adjacent the lower end of said second hopper disposed to dispense ice exteriorly of said cabinet and said hoppers.

5. Ice handling apparatus comprising an ice storage hopper, dispensing means adjacent the lower end of said hopper including movable door means for selectively preventing and accommodating discharge of ice from said hopper, selectively energized means operative when energized to open said door means and accommodate discharge of ice from said hopper, and timing means for the latter means for maintaining the same energized for a predetermined period of time to accommodate discharge of a predetermined quantity of ice.

6. Ice handling apparatus comprising an ice storage hopper, dispensing means adjacent the lower end of said hopper including movable door means for selectively preventing and accommodating discharge of ice from said hopper, motor means operative when energized to open said door means and accommodate discharge of ice from said hopper, timing means for said motor means including a plurality of timing cycles for maintaining said motor means energized for respective predetermined periods of time, selector means for said timing means for selecting any one of said timing cycles, and control means for energizing said timing means and said motor means.

7. Ice handling apparatus as set forth in claim 6, wherein said selector means includes means accommodating continuous energization of said motor means by said control means.

8. Ice handling and beverage dispensing apparatus comprising a storage hopper for ice, a carbonator having at least part of its wall extending into said hopper to be contacted and chilled by ice in the hopper, a conveniently accessible dispenser assembly, beverage supply lines leading to said assembly including a line from said carbonator to said assembly, a plurality of selectors on said assembly for selecting one of a plurality of beverages, ice dispensing means combined with said assembly having door means for selectively preventing and accommodating discharge of ice, motor means for opening said door means, and control means for said motor means coupled to said selectors for causing ice to be discharged substantially simultaneously with the selected beverage dispensed.

9. Ice handling and beverage dispensing apparatus comprising a cabinet, an ice maker in said cabinet, a storage hopper for ice in said cabinet disposed to receive ice from said ice maker, ice elevating means extending upwardly from said hopper, a second storage hopper for ice mounted adjacent the upper end of said elevating means, said elevating means discharging into the upper end portion of said second hopper, dispensing means adjacent the lower end of said second hopper including movable door means for selectively preventing and accommodating discharge of ice from said second hopper, motor means operative when energized to open said door means and accommodate discharge of ice from said second hopper, timing means for said motor means including a plurality of timing cycles for maintaining said motor means energized for respective predetermined periods of time, selector means on said timing means for selecting any one of said timing cycles, liquid dispensing means immediately adjacent said ice dispensing means for discharging liquid into the area into which ice is discharged, and control means for simultaneously energizing said timing means, said motor means and said liquid dispensing means.

References Cited by the Examiner

UNITED STATES PATENTS

| | | | |
|---|---|---|---|
| 2,003,417 | 6/35 | Andreas | 214—17 |
| 2,354,647 | 8/44 | Blusson | 222—56 X |
| 2,399,228 | 4/46 | Irmscher | 222—56 X |
| 2,743,860 | 5/56 | Saxe | 222—56 X |
| 2,889,083 | 6/59 | Schwinhorst | 222—252 |
| 2,962,191 | 11/60 | Moore | 222—412 X |
| 3,075,363 | 1/63 | Conto | 222—239 X |
| 3,095,097 | 6/63 | Mellow | 222—56 X |

LOUIS J. DEMBO, *Primary Examiner.*

HADD S. LANE, *Examiner.*